United States Patent Office 3,265,640
Patented August 9, 1966

3,265,640
CROSSLINKED POLYMERS FROM α,α-DICHLORO-p-XYLENE AND POLYSUBSTITUTED BENZENES
Wendell C. Overhults, Silver Spring, Arthur D. Ketley, Bethesda, and Frank X. Werber, Rockville, Md., assignors to W. R. Grace & Co., New York, N.Y., a corporation of Connecticut
No Drawing. Filed Feb. 28, 1964, Ser. No. 348,269
8 Claims. (Cl. 260—2)

This invention relates to a shaped crosslinked polymeric composition and a process for producing same. More particularly, this invention is concerned with forming soluble aromatic polymers by condensation polymerization, shaping said polymers into a desired shape and thereafter insolubilizing the shaped polymeric article by crosslinking same.

Polymers containing aromatic rings have relatively high thermal stability as compared with aliphatic polymers. Polybenzyl has quite high thermal stability, but it has only been obtained as an amorphous, low melting (80–100° C.), low molecular weight (1,000–3,000) polymer. The amorphous character and low molecular weight have been attributed to the effect of multiple substitution of the benzene rings. Polymers having substituents on the ring to prevent substitution, such as those derived from durene, have been prepared previously. See Madorsky, S. C., and S. Straus, J. Research Natl. Bur. Standards, 53, No. 6, 361 (1954); A. A. Vansherdt, et al., J. Polymer Sci., 52, 179 (1961); and U.S. 2,870,098. These materials are crystalline and high melting, but of low molecular weight; degree of polymerization, (DP<5). The low molecular weight might be due to the insolubility of the polymer. A less crystalline and more soluble polymer would be expected to have a higher molecular weight. The crystallinity might be decreased by introducing a controlled amount of branching into the polymer. Also, a polymer containing at least some meta or ortho linkages instead of para linkages, as in the polymers derived from durene, might have lessened crystallinity.

In attempts to introduce limited branching, to produce a less intractable polymer, copolymers of bischloromethyldurene/p - xylene; durene/α,α' - dichloro - p-xylene; and 1,4 - dichloromethyl - 2,5 - dimethyl benzene/p - xylene were prepared. However, these polymers were still highly crystalline, insoluble, and of low molecular weight. These materials can neither be shaped nor crosslinked. However, when the number of methyl groups is further reduced e.g. copolymers of α,α'-dichloro-p-xylene with p-xylene, m-xylene, o-xylene or tetralin, soluble low melting polymers of high molecular weight are formed which can be shaped and crosslinked.

One object of this invention is to produce polymers containing aromatic rings having relatively high thermal stability as compared with aliphatic polymers. Another object of the instant invention is a shaped crosslinked polymeric material having improved resistance to organic and inorganic solvents and improved thermal properties. Another object of this invention is to produce a shaped crosslinked polymeric material by a novel process. Other objects will become apparent from a reading hereinafter.

These and other objects are accomplished by reacting α,α'-dichloro-p-xylene,

and polysubstituted benzenes of the formula

wherein R is a member of the group consisting of alkyl groups containing 1 to 4 carbon atoms and alkylene groups containing 4 to 8 carbon atoms connected with adjacent benzene carbon atoms to form a cycloalkylene group and n is an integer of at least 2 and not more than 3, preferably in a 1:1 mole ratio in the presence of a Friedel-Crafts type catalyst under anhydrous conditions at temperatures in the range 40 to 150° C. to form a soluble condensate polymer of α,α'-dichloro-p-xylene and the polysubstituted benzene having the following recurring structural unit:

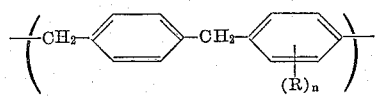

wherein R and n are the same as in the polysubstituted benzene reactant, recovering said soluble condensate polymer, adding a catalytic amount of a Friedel-Crafts catalyst to said polymer, shaping said polymer into a desired shape at temperatures of 20–175° C. and thereafter curing the shaped polymer at temperatures of 135°–300° C. The condensate byproduct of the polymerization reaction is HCl.

In the above formula for polysubstituted benzene it is critical in order to obtain a crosslinked polymer, that when n is 3, at least two of the R groups must be attached to adjacent carbon atoms on the benzene ring. If the three R groups are symmetrical, steric hindrance prevents the formation of a subsequent crosslinked polymer.

In practicing the invention it is also possible, but not necessary to add additional α,α'-dichloro-p-xylene monomer to the soluble condensation polymer and Friedel-Crafts catalyst to aid in forming crosslinked polymer. Additional amounts of said monomer in the range 0.5 to 10 percent by weight of the soluble condensation polymer can be employed.

As used herein when the polysubstituted benzene is xylene it can be para-xylene, ortho-xylene, meta-xylene or mixtures thereof.

The shaping and crosslinking step can be performed substantially simultaneously, if desired, especially at the lower curing temperature range where the rate of cure is sufficiently slow to allow shaping to proceed unhindered. For example, it is possible to mold the soluble polymer with a catalytic amount of Friedel-Crafts catalyst into film form in a press at about 150° C. and recover a crosslinked film of the polymer as is shown in Example 9 hereinafter. Within the temperature limits, the curing period ranges from about 5 minutes to 24 hours.

The soluble polymer can be shaped by various means well known in the art. For example the polymer can be shaped by casting a film thereof from solution at temperatures ranging from 20° C. up to the melting point of the polymer. Another method would be to mold the polymer into a desired shape at temperatures ranging from its melting point up to 175° C.

The condensation polymerization reaction is preferably performed at atmospheric pressure, however sub- and super-atmospheric pressures are operable.

The polymerization reaction is preferably performed in the absence of a solvent at temperatures in the range 85–135° C. The polymerization reaction temperature is dependent upon the solubility of the α,α'-dichloro-p-xylene in the polysubstituted benzene or solvent employed. The duration of the reaction is dependent upon the reaction temperature with shorter reaction periods being employed at the upper temperature limit. For example if the reaction is performed at 135° C. a reaction time of 10–30 minutes is sufficient to obtain a soluble polymer whereas at a reaction temperature of 85° C., the reaction time is of the order of 2–6 hours to obtain a soluble polymer. It is also possible to employ a solvent, e.g. chlorobenzene, if desired during the polymerization. If a chlorobenzene solvent is used, the reaction temperature is 40 to 85° C.

During the condensation polymerization reaction, in order to obtain a soluble polymer, it is critical that the reaction be stopped when not more than 60%, preferably 50–60%, of the theoretical amount of HCl from the condensation polymerization is evolved. If the reaction goes to the point where more than 60% of the theoretical amount of HCl is evolved, crosslinking of the polymer product occurs, resulting in an unshapeable crosslinked polymer, insoluble in various organic and inorganic solvents. One method to ascertain the amount of HCl evolved is to pass the HCl into water and titrate with a base. Other methods are well known to those skilled in the art. Once 60% of the theoretical amount of HCl is evolved from the condensation polymerization reaction, the reaction is immediately discontinued by the addition of an organic alcohol, e.g. methanol, to kill the catalyst and an excess of an aromatic solvent e.g. xylene, toluene, benzene, chlorobenzene etc. to disperse the polymer formed. In practice it has been found that optimum yields of soluble polymer are obtained when the yield based on the reactants is 50% or less.

As used herein, the term "Friedel-Crafts catalyst" means any Lewis acid capable of initiating cationic, that is carbonium ion type alkylation. Examples of Friedel-Crafts catalyst include, but are not limited to, TiCl$_4$, SnCl$_4$, AlCl$_3$, BF$_3$ and the like. The amount of Friedel-Crafts catalyst used in this invention can be varied within wide limits. A mole ratio of α,α-dichloro-p-xylene: Friedel-Crafts catalyst in the range 2000 to 200:1 preferably 1000 to 500:1 is used in performing the invention. For ease in handling uniformity of dispersion the catalyst can, if desired, be added in solution.

The polymerization is performed under anhydrous conditions in order to retain the catalyst in a highly reactive state. The reaction is operable in moisture-free air or in an inert atmosphere such as dry nitrogen or the noble gases.

After the desired stage of polymerization is reached, an excess of an aromatic hydrocrabon solvent is added to the reaction along with a minor amount of an aliphatic alcohol, e.g. methanol, ethanol, 1-butanol etc. to kill the catalyst and to preclude crosslinking. The soluble polymer is precipitated in an excess of an aliphatic alcohol, e.g. methanol, to separate it from unreacted α,α'-dichloro-p-xylene and polysubstituted benzene which remain dissolved in the alcohol. The polymer is then ground in a Waring Blendor, filtered and dried. Repurification can be accomplished, if desired, by redissolving the dried polymer in benzene, and reprecipitating it in methanol followed by regrinding, refiltering and redrying. The dried soluble polymer is in the form of a white powder. The polymer at this point has a melting point in the range of 70° to 130° C. and is soluble in various aromatic hydrocarbon solvents, e.g. benzene, toluene, tetralin and various other chlorinated solvents, e.g. methylene chloride, chloroform, carbon tetrachloride, chlorobenzene etc. The soluble polymer along with a catalytic amount of Friedel-Crafts catalyst i.e. 0.01 to 0.5% catalyst based on the weight of polymer, can be cast in the form of film from solution in the aforestated solvents at temperatures ranging from 20° C. up to the melting point of the polymer or molded at temperatures above its melting point and thereafter heated to temperatures in the range 135–300° C., preferably 175–220° C. to crosslink the polymer. Thus the soluble polymer having the following recurring structural unit:

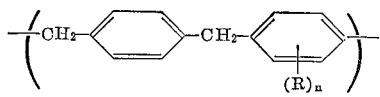

wherein R and $n$ are the same as in the polysubstituted benzene reactant, on heating to 135–300° C. in the presence of a minor amount of Friedel-Crafts catalyst gives a cross-linked polymer containing intermittent structural units of the group consisting of

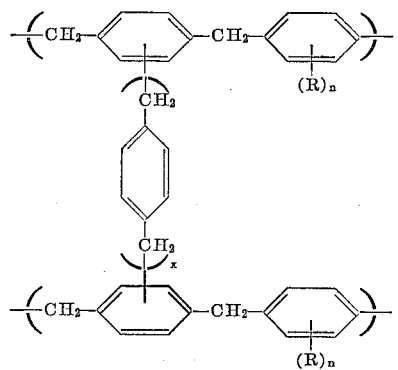

and

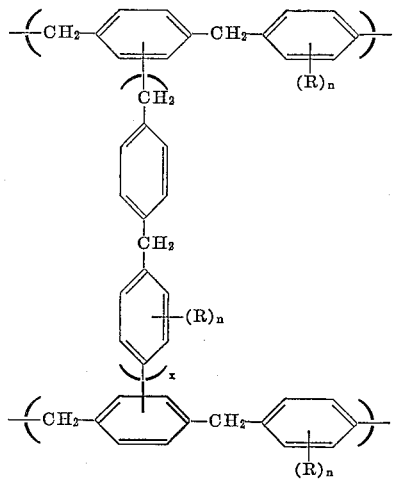

wherein R and $n$ are the same as in the polysubstituted benzene reactant and $x$ is at least 1. The crosslinked polymers of the instant invention do not melt or flow at temperatures up to 500° C. The crosslinked polymer is thermally quite stable in vacuum or air. The integral procedural decomposition temperatures (IPDT) in air and vacuum vary from 450 to 535° C.

Because of their high melting points, good thermal stability and lack of solubility in organic or inorganic solvents, these materials may be used as gasketing materials, sealants, protective coatings, foams, in electric insulation, in fiber laminates and as potting compounds.

The following examples will aid in understanding the invention but should in no way be deemed as limiting in scope.

The integral procedural decomposition temperature (IPDT) in ° C. was measured using the method of C. D. Doyle, Analytical Chemistry, vol. 33, No. 1, pp. 77–79, January 1961.

The number average molecular weight of the polymer products of this invention were measured on a Mechrolab Vapor Pressure Osmometer, Model 301–A manufactured by Mechrolab Inc., Mountain View, Calif. in accordance with the instructions therefor.

All parts and percentages are by weight unless otherwise noted.

*Example 1*

3.0 g. (0.017 mole) of α,α'-dichloro-p-xylene is added to 1.84 g. (0.017 mole) of p-xylene in a nitrogen purged 20 cc. test tube fitted with a nitrogen inlet and exit tube and a rubber diaphragm for insertion of a hypodermic syringe. Nitrogen is passed through the tube and the mixture is heated to 85° C. in an oil bath. 0.2 cc. of 0.1

MTiCl₄ in n-pentane is added to the tube. After 2 hours at 85° C., 60% of the theoretical amount of HCl is evolved. 10 cc. toluene is added. All of the viscous liquid dissolves with no gel present. The toluene solution is added to 150 cc. isopropyl alcohol. The white solid condensate polymer which precipitates is filtered and washed well with isopropanol. The solid polymer is dissolved in toluene and precipitated as before. After drying 24 hours in vacuo, the condensate polymer weighed 1.1 g. had a melting point of 110–125° C., a molecular weight of 2700 and a degree of polymerization (DP) of 26. 0.2 g. of the polymer is dissolved in 2 cc. methylene chloride. 0.05 g. α,α′-dichloro-p-xylene and 0.02 cc. of 0.1 MTiCl₄ solution were added to the polymer-containing solution. The solution was spread on a Teflon sheet and allowed to dry over-night leaving a clear film. The sheet was placed in an oven at 170° C. for 30 minutes for crosslinking. The crosslinked film was removed from the Teflon sheet. The crosslinked film did not melt at 500° C. (upper limit of temperature of the Nalge-Axelrod apparatus). The crosslinked film was not soluble or swelled by refluxing benzene, toluene, or methylene chloride over an 8 hour period. The thermal stability of the crosslinked polymer was measured by means of a thermal balance heated at a rate of 3° C./min. The crosslinked polymer had an integral procedural decomposition temperature (IPDT) of 535.8° C. in air and 496.0° C. in vacuo (0.2 mm. Hg).

*Example 2*

0.2 g. of the soluble polymer from Example 1 was dissolved in 2 cc. benzene and about 0.005 gms. of anhydrous FeCl₃ was added. The solution was spread on a Teflon sheet and allowed to stand at room temperature overnight. A clear film was formed. The Teflon sheet was placed in an oven at 180° C. for 30 minutes. The crosslinked film was stripped from the Teflon sheet. The crosslinked film did not melt at temperatures up to 500° C. The crosslinked film was not soluble or swelled by refluxing benzene, xylene, toluene or methylene chloride over an 8 hour period.

*Example 3*

The procedure of Example 2 was repeated except that the film was heated at 150° C. for 30 minutes. The properties of the film were as described in Example 2.

*Example 4*

The procedure of Example 1 was repeated except that o-xylene was substituted for p-xylene. The weight of the toluene-soluble polymer was 1.8 g. and the polymer had a melting point of 85–95° C. The properties of the cross linked film were as described in Example 1 except that the (IPDT) was 493.6° C. in air and 445.9° C. in vacuo (0.2 mm. Hg).

*Example 5*

The procedure of Example 1 was repeated except that m-xylene was substituted for p-xylene. The weight of the toluene-soluble polymer was 2.0 g. and the polymer had a melting point of 75–85° C. The properties of the cross linked film were as described in Example 1 except that the (IPDT) was 496.4° C. in air and 470.5° C. in vacuo (0.2 mm. Hg).

*Example 6*

The procedure of Example 1 was repeated except that xylene (commercial mixture of isomers) was substituted for p-xylene. The weight of the toluene-soluble polymer was 2.0 g. and the polymer had a melting point of 95–105° C. The solubility and melting properties of the crosslinked film were as described in Example 1.

*Example 7*

The procedure of Example 1 was followed except tetraline was substituted for p-xylene. The weight of the toluene-soluble polymer was 1.8 g. The solubility and melting properties of the crosslinked film were as described in Example 1 and the (IPDT) was 450.8° C. in vacuo (0.2 mm. Hg).

*Example 8*

The procedure of Example 1 was followed except that 1,2,4-trimethylbenbzene was substituted for p-xylene. The weight of the toluene-soluble polymer was 1.1 g. The solubility properties of the crosslinked film were as described in Example 1.

*Example 9*

0.05 cc. of 0.1 MSnCl₄ in n-heptane was added to 2.0 g. of soluble polymer prepared as in Example 1. The mixture was pressed into film form between Teflon sheets in a hydraulic press heated to 150° C. The material was kept in the press for 20 minutes. The film does not melt up to 500° C. Strips cut from the film were tested for thermal stability by being suspended in air in a tube furnace under a tension of 5 p.s.i. At 310° C., the strips discolored somewhat within one hour. After 72 hours at 310° C., the strips showed no further signs of decomposition.

The following example shows the inability to form soluble, non-crystalline polymers which can be subsequently shaped and crosslinked when the condensation polymerization is carried to a yield in excess of 50% by weight of the reactants.

*Example 10*

1.51 g. (0.0086 mole) of α,α′-dichloro-p-xylene is added to 0.92 g. (0.0086 mole) of p-xylene in a nitrogen purged 20 cc. test tube fitted with a nitrogen inlet and exit tube and a rubber diaphragm for insertion of a hypodermic syringe. Nitrogen is passed through the tube and 0.2 cc. of 0.1 MTiCl₄ in n-pentane is added to the tube. The tube was immersed in a silicone oil bath to maintain the reaction at 125° C. After 16 hours at 125° C., the reaction was discontinued. The solid polymer product was added to excess methanol and ground in a Waring Blendor. The material was very hard and did not grind finely. The solid polymer was filtered, washed with methanol, refiltered and dried in vacuo at 40° C. The solid crosslinked polymer product weighed 1.57 g. and was insoluble in refluxing acetone, benzene, toluene, decalin, α-bromo-naphthalene and 1-chloromethylnaphthalene. At 200° C. the polymer becomes somewhat rubbery but did not melt even at 500° C. On heating the material became harder. Attempts to press a sample of the polymer into film at 300° C. and 40000 p.s.i. failed to yield a cohesive film.

If desired, fillers, softening agents, dyestuffs and pigments can be added to the soluble polymer of the instant invention prior to the shaping step.

The monomers used to prepare the polymers of the instant invention contain sufficient alkyl substituents on the benzene rings to prevent, by steric hindrance, crosslinking of the polymer before a high molecular weight is reached. However, enough reactive sites are left on the rings so that the high molecular weight pre-polymer may be crosslinked in a second step. If less steric hindrance is present, the polymer will crosslink at a very low molecular weight i.e. DP<5. If the benzene rings contain more alkyl substituents, the resulting polymer is highly crystalline and extremely insoluble and, because of this, cannot grow to a high molecular weight. Also, because of the excessive number of alkyl groups present, steric hindrance is so great that no crosslinking can take place.

The following Examples 11–18 in Table I show aromatic reactants which contain excessive alkyl substituents which result in the formation of highly crystalline, insoluble polymer of low molecular weight. In all examples in Table I the polymerizations were carried out in a 25 x 75 mm. test tube fitted with a neoprene stopper containing a gas inlet tube reaching nearly to the bottom of the test tube, a gas exit tube and a rubber diaphragm for insertion of hypodermic needles. The tubes were flushed well with dry nitrogen and the reactants added in a 1:1 mole ratio followed by solvent, if used. The tubes were immersed in a constant temperature bath and a stream of nitrogen was passed through the tubes during the polymerization. After the reactants were liquid, 0.5 molar percent TiCl₄ catalyst in solution in n-heptane was added to each tube and the reaction was continued for the time and temperature specified. Due to the steric hindrance of the alkyl groups on the reactants it was necessary to run the reaction for a longer period in order to obtain sufficient polymer, although minute amounts of particulate polymer precipitated within 10 minutes after start of the reaction. The solid polymer products were extracted with n-heptane, dried in vacuum oven at 40° C. overnight and characterized thereafter. The results are given in Table I.

What is claimed is:
1. The process of forming a shaped crosslinked polymer which comprises reacting $a,a'$-dichloro-p-xylene and a polysubstituted benzene of the formula,

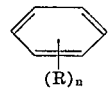

in a 1:1 mole ratio, in the presence of a catalytic amount of a Friedel-Crafts catalyst at a tempearture in the range 40–150° C. to form a soluble condensate polymer having the following recurring structural unit:

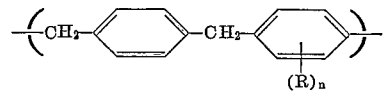

recovering said soluble polymer, adding a further catalytic amount of a Friedel-Crafts catalyst to said recovered soluble polymer, shaping said polymer into a desired shape at temperatures in the range 20–175° C. and TABLE I[a]

| Ex. No. | Monomer 1 | Monomer 2 | Reaction Temp.[d] (° C.) | Reaction Time, Hr. | Percent Conv. | Melting Point (° C.) | Crystallinity[c] | D.P. | Soluble |
|---|---|---|---|---|---|---|---|---|---|
| 11 | ClH₂C—C₆(CH₃)₄—CH₂Cl | C₆H₂(CH₃)₄ | 125 | 16 | 50 | 350 | + | [d] 4 | (b). |
| 12 | ClH₂C—C₆(CH₃)₄—CH₂Cl | C₆H₄(CH₃)₂ | 125 | 16 | 50 | 285 | + | [d] 4 | (b). |
| 13 | C₆H₂(CH₃)₄ | ClH₂C—C₆H₄—CH₂Cl | 105 | 16 | 60 | 300 | + | [d] 4 | |
| 14 | ClH₂C—C₆H₄—CH₂Cl | C₆H₂(CH₃)₄ | 125 | 16 | 60 | >350 | + | | |
| 15 | ClH₂C—C₆(CH₃)₄—CH₂Cl | C₆H₄(CH₃)—CH₃ | 135 | 24 | A 5 / B 20 | >350 / 95–105 | + / − | [e] 4–5 | No Benzene. |
| 16 | ClH₂C—C₆(CH₃)₄—CH₂Cl | C₆H₅—CH₃ | 135 | 24 | 70 | 140–70 | + | [e] 2–3 | Benzene, Methanol. |
| 17 | ClH₂C—C₆(CH₃)₄—CH₂Cl | H₃C—C₆H₃—CH₃ | 135 | 24 | A 20 / B 40 | 130–40 / 130–40 | + / + | [e] 4–5 / 2–3 | Benzene. Benzene, Methanol. |
| 18 | ClH₂C—C₆(CH₃)₄—CH₂Cl | C₆H₂(CH₃)₄ | 135 | 24 | 60 | 105–20 | + | [e] 3 | Benzene. |

[a] In all examples in Table I, equimolar amounts of each monomer used, 0.5 molar percent TiCl₄ used as catalyst and 2 cc. decalin used as solvent.
[b] All polymer products were insoluble in refluxing benzene and toluene.
[c] Crystallinity determined by X-ray. Plus sign indicates polymer is crystalline; minus sign indicates polymer is amorphous.
[d] Degree of polymerization (DP) calculated from chloride end group analysis.
[e] Degree of polymerization (DP) determined by vapor phase osmometer.

curing the shaped polymer at temperatures of 135–300° C. to form a shaped crosslinked polymer containing intermittent structural units from the group consisting of:

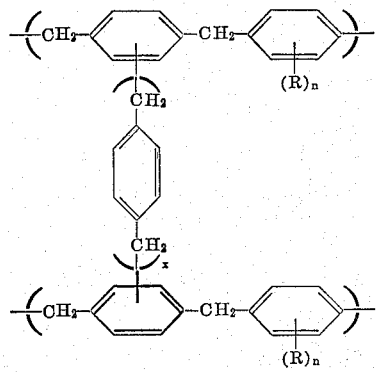

and

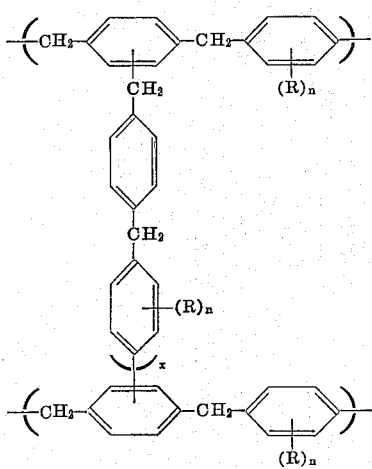

with substantially all of the remaining intermittent units having the formula:

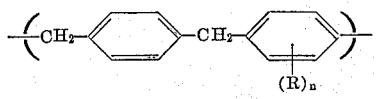

where in all of said preceding formulas, R is a member of the group consisting of an alkyl group containing 1 to 4 carbon atoms and alkylene groups containing 4 to 8 carbon atoms connected with adjacent benzene carbon atoms to form a cycloalkylene group, $n$ is in integer of from 2 to 3 provided that when $n$ is 3 at least two of the R groups are attached to adjacent carbon atoms on the benzene ring and $x$ is at least 1.

2. The process according to claim 1 wherein 0.5 to 10% by weight of the soluble polymer, of $\alpha,\alpha'$-dichloro-p-xylene is added to the recovered soluble polymer prior to the shaping step.

3. The process according to claim 1 wherein the polysubstituted benzene is tetralin.

4. The process according to claim 1 wherein the polysubstituted benzene is ortho-xylene.

5. The process according to claim 1 wherein the polysubstituted benzene is meta-xylene.

6. The process according to claim 1 wherein the polysubstituted benzene is para-xylene.

7. The process according to claim 1 wherein the polysubstituted benzene is 1,2,4-trimethylbenzene.

8. A crosslinked polymer containing intermittent structural units from the group consisting of:

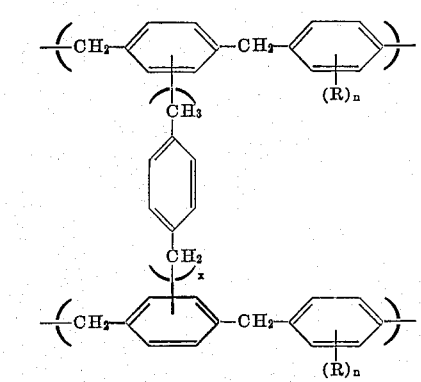

and

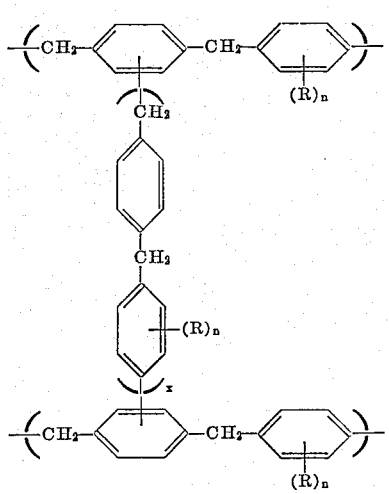

with substantially all of the remaining intermittent units having the formula:

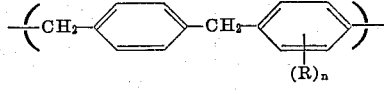

where in said preceding formulas, R is a member of the group consisting of an alkyl group containing 1 to 4 carbon atoms and alkylene groups containing 4 to 8 carbon atoms connected with adjacent benzene carbon atoms to form a cycloalkylene group, $n$ is an integer of from 2 to 3 provided that when $n$ is 3 at least two of the R groups are attached to adjacent carbon atoms on the benzene ring and $x$ is at least 1.

References Cited by the Examiner

UNITED STATES PATENTS 2,870,098    1/1959    Martin et al. _____ 260—2

FOREIGN PATENTS 551,169    5/1932    Germany.

SAMUEL H. BLECH, *Primary Examiner.*